US007970421B2

(12) United States Patent
Murphy et al.

(10) Patent No.: US 7,970,421 B2
(45) Date of Patent: Jun. 28, 2011

(54) SESSION MANAGEMENT SYSTEM AND METHOD FOR USE WITH STATELESS MESSAGING SERVICES

(75) Inventors: Anthony J. Murphy, San Francisco, CA (US); Kirk L. Hendrickson, Pleasanton, CA (US); Steve G. Priddle, Ottawa (CA); Kristopher Zawadka, Gatineau (CA)

(73) Assignee: MarketTools, Inc., San Francisco, CA (US)

( * ) Notice: Subject to any disclaimer, the term of this patent is extended or adjusted under 35 U.S.C. 154(b) by 729 days.

(21) Appl. No.: 11/733,722

(22) Filed: Apr. 10, 2007

(65) Prior Publication Data
US 2008/0254815 A1 Oct. 16, 2008

(51) Int. Cl.
*H04W 4/00* (2009.01)
(52) U.S. Cl. ..................................... 455/466; 455/414.1
(58) Field of Classification Search .................. 455/466, 455/414.1–414.4
See application file for complete search history.

(56) References Cited

U.S. PATENT DOCUMENTS

| 2002/0080822 | A1 | 6/2002 | Brown et al. | |
| 2002/0104007 | A1* | 8/2002 | Moodie et al. | 713/200 |
| 2002/0119793 | A1* | 8/2002 | Hronek et al. | 455/466 |
| 2002/0155826 | A1 | 10/2002 | Robinson et al. | |
| 2003/0114224 | A1* | 6/2003 | Anttila et al. | 463/40 |
| 2003/0144895 | A1 | 7/2003 | Aksu et al. | |
| 2003/0198934 | A1 | 10/2003 | Sendowski et al. | |
| 2003/0219709 | A1 | 11/2003 | Olenick et al. | |
| 2004/0157628 | A1* | 8/2004 | Daniel et al. | 455/466 |
| 2004/0198322 | A1 | 10/2004 | Mercer | |
| 2004/0254018 | A1* | 12/2004 | Priestar | 463/42 |
| 2005/0197164 | A1 | 9/2005 | Chan | |
| 2006/0227754 | A1 | 10/2006 | Ko | |
| 2006/0288212 | A1 | 12/2006 | Chiang | |
| 2009/0163231 | A1* | 6/2009 | Yoo | 455/466 |

OTHER PUBLICATIONS

U.S. Appl. No. 11/733,725, filed Apr. 10, 2007, Murphy et al.

* cited by examiner

*Primary Examiner* — Kent Chang
*Assistant Examiner* — Marcus Hammonds
(74) *Attorney, Agent, or Firm* — Davis Wright Tremaine LLP; Heather M. Colburn

(57) ABSTRACT

The present system uses dynamic assignment of key codes to select options of response content in request messages prior to transmission from an application server to a communication device. Dynamic assignment of key codes to selection options can occur according to a list of key codes having a predefined order also known as a predefined key code series. A key code series could be ordered according to ergonomic considerations or other considerations such as according to an alphabetic or numeric ordering. Communication occurs between one or more server applications running on an application server and a particular communication device, such as a cell phone. Dynamic key code assignment addresses problems raised when one communication device is concurrently carrying on more than one session with one or more server applications since the communication device identifier, such as a phone number, will be the same for all sessions.

26 Claims, 7 Drawing Sheets

SESSION MANAGEMENT SYSTEM AND METHOD FOR USE WITH STATELESS MESSAGING SERVICES

BACKGROUND OF THE INVENTION

1. Field of the Invention

The present invention is directed generally to communication sessions with stateless services.

2. Description of the Related Art

Stateless messaging services including the Short Message Service (SMS) allow for exchanges of text messages between two devices such as wireless phones including cellular phones and other communication devices. In addition to the text, a sender's message generally contains the telephone number or other device identifier of the sender's communication device.

Although stateless messaging allows for a receiving device to identify the sending device of a message, there is nothing inherent in a stateless messaging service that provides further contextual information. If a first device sends out a number of first messages to a second device and the second device sends one message to reply to a particular one of the first messages, the first device will not be able to determine which of the first messages is being responded to without additional information contained in the text portion of the particular one of the first messages.

This lack of contextual information can be problematic for systems such as survey systems or expert systems that may use a stateless messaging service such as SMS for sending messages that request content regarding a survey, guidance to be furnished, or other specific purpose of the system. Conventional solutions have required users to key in various identifiers, such as a keyword for the server application involved, and/or other keywords or alphanumeric data to identify the session and message. This identifier input requiring data entry, such as by keying, is in addition to the content furnished in response to a content request found in a message sent from the application server. This amount of keying related to identifier information is in addition to that expected by users to furnish content requested by a server application so potentially can cause a degree of annoyance for the users.

The separate identifier keywords and other alphanumeric data can then be used by the conventional approaches to determine to which server application, session, and message a response message is being sent in reply. Annoyance for users can be further increased when further complications arise when the number of concurrent sessions between an application server and a particular communication device increases due to additional applications on the server being concurrently used by the communication device. Further complexity and annoyance can exist when multiple sessions between a server and a device uses the same server application generating a duplicate series of messages to track. As the number of messages generated for any one server application increases, complexity and annoyance can further increase. Implementing such conventional identification approaches can also be problematic for the server application since conventional approaches can require that identifier instructions be stored and maintained along with message content to be sent out by the server application.

BRIEF DESCRIPTION OF THE SEVERAL VIEWS OF THE DRAWING(S)

DETAILED DESCRIPTION OF THE INVENTION

Figure 1:
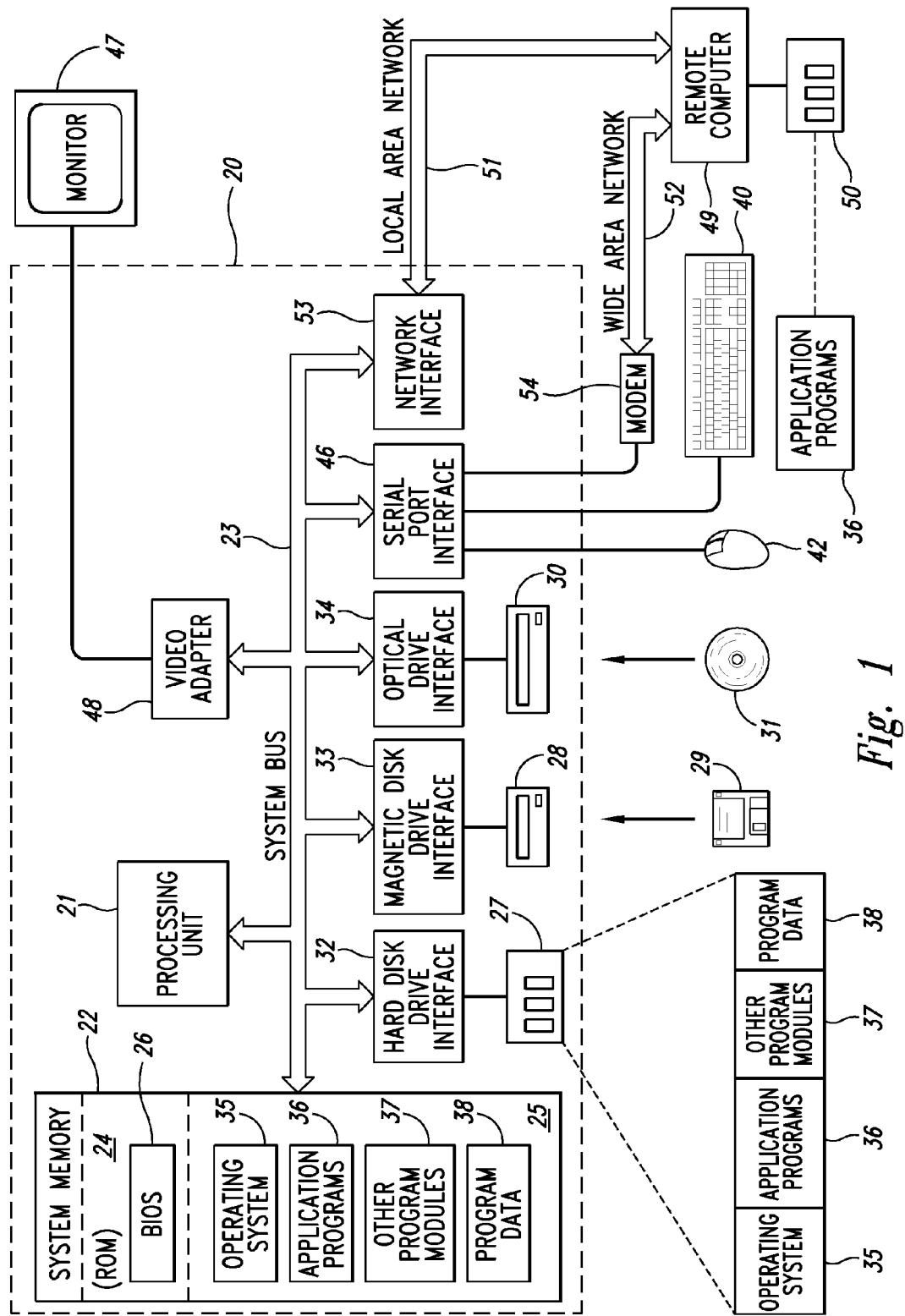
FIG. 1 is a schematic block diagram of a computer and associated equipment that is used with implementations of the system.

As will be discussed in greater detail herein, a session management system and method is disclosed. In implementations, the session management system runs on a server with session based applications. Each of the session based applications generates messages requesting response content associated with the particular purpose of the session based application. For instance, if the purpose of a session based application is to conduct a market survey, the messages generated by the session based application can request response content regarding the market survey. Such response content could be in the form of indications of preferences, buying habits, associations, etc.

As another example, if the purpose of a session based application is to explain a subject area, the messages generated by the session based application can request response content regarding the explanation of the subject area. Such response content could be in the form of indications of what portion of the subject area is desired to be further explained and/or indications of whether a prior explanation was pertinent or understood.

Each request message contains response content options identified by individual key codes to be selected by the recipient of the request message in response to the response content request found in the request message. For example, the response content request of a request message sent from a server application having a survey purpose may call for a selection between the colors green, red, and blue with each color identified by individual key codes "a," "b," and "c," respectively. Selection of one of the individual key codes "a," "b," and "c," would then be contained by a response message to provide the requested response content.

The present system uses dynamic assignment of key codes to select options of response content in request messages prior to transmission from the application server to a communication device. Dynamic assignment of key codes to selection options can occur according to a list of key codes having a predefined order also known as a predefined key code series. A key code series could be ordered according to ergonomic considerations or other considerations such as according to an alphabetic or numeric ordering.

Dynamic assignment of key codes is generally done within the context of communication between one or more server applications running on an application server and a particular communication device, such as a cell phone. Typically an application server can distinguish the communication devices from one another by using their phone numbers or other identifier that is inherent with the stateless messaging service used, such as SMS. In these cases, dynamic key code assignment is not required by an application server to keep track of different communication devices. For alternative cases where the communication devices need to be identified independent from the messaging service used, dynamic key code assignments can be used for this device identification as well.

For the general cases where the messaging service, such as SMS, can be used to identify communication devices having sessions with an application server, the dynamic key code assignment is used to address problems raised when one communication device is concurrently carrying on more than one session with one or more server applications since the communication device identifier, such as a phone number, will be the same for all of the sessions engaged between the server applications and the communication device. Use of dynamic key code assignments for multiple concurrent sessions of an application server with a common communication device can include two types of approaches. With the first approach, implementations of dynamic assignment of key codes may be used to identify first time responses to individual response content requests and also identify additional responses to response content requests that have already had first time responses received by the application server. Typically these additional responses are sent by the communication device to the application server due to a user error.

With the second approach, it is assumed that such additional responses are infrequent enough so that dynamic assignment of key codes is performed without providing an ability to identify when an additional response has been made. The second approach gains certain efficiencies in use of key codes by not having to identify these additional responses should they occur.

When the ability to identify additional responses to a response content request that has already received a first time response under the first approach is desired, then each of the key codes are dynamically assigned to only one content option of one response content request message for an associated session between a communication device and an application server until that associated session has expired. At the point that the associated session has expired, the key code can be assigned again to another content option of another response content request message of another session between the communication device and the application server and so on. As discussed above, following this first approach, the same key code can be dynamically assigned concurrently for each of a plurality of communication devices with messaging services, such as SMS, that have capability to identify the communication device apart from dynamic key code assignment.

When the ability to identify additional responses to a response content request that has already received a first time response is not desired, then each of the key codes are dynamically assigned to only one content option of one response content request message for an associated session between a communication device and an application server until a response session message associated with the one response content request message has been received by the application server. After receipt, the key code can be assigned to another content option of another response content request message of the same session and so on. Once the same session has expired, the key code can be assigned to another content option of another response content request message of another session between the communication device and the application server and so on. As discussed above, the same key code can be dynamically assigned following this second approach concurrently to a session of each of a plurality of communication devices with messaging services, such as SMS, that have capability to identify the communication device apart from dynamic key code assignment.

Implementations can have various key code reuse configuration parameters including reuse according to time since a key code's question was unanswered, according to time since a key code's question was answered, according to number of questions since the key code's question was unanswered, and according to number of questions since the key code's question was answered.

Dynamic assignment of key codes allows the present system to use a particular one of the key codes to simultaneously identify in a response message to a content request message, the selected response content, the associated server application, the associated session, and the response message itself. This simultaneous identification by the one key code occurs without need of additional entry of keywords or other identifying alphanumeric code into the response message. Through dynamic assignment of key codes, the system uses all of the key codes that are assigned so that the number of characters used for each of the key codes can be kept to a minimum. In other words, there is no need to use an additional number of characters for a key code to distinguish from key codes that end up not being used since all key codes assigned are used.

FIG. 1 is a diagram of the hardware and operating environment in conjunction with which implementations may be practiced. The description of FIG. 1 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that implementations may be practiced with other computer system configurations, including hand-held devices, multiprocessor systems, microprocessor-based or programmable consumer electronics, network PCs, minicomputers, mainframe computers, and the like. Implementations may also be practiced in distributed computing environments where tasks are performed by remote processing devices that are linked through a communications network. In a distributed computing environment, program modules may be located in both local and remote memory storage devices.

The exemplary hardware and operating environment of FIG. 1 includes a general purpose computing device in the form of a computer 20, including a processing unit 21, a system memory 22, and a system bus 23 that operatively couples various system components, including the system memory 22, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20, the local computer; implementations are not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with implementations that may be practiced has been described. The computer in conjunction with implementation that may be practiced may be a conventional computer, a distributed computer, or any other type of computer. Such a computer typically includes one or more processing units as its processor, and a computer-readable medium such as a memory. The computer may also include a communications device such as a network adapter or a modem, so that it is able to communicatively couple to other computers.

Figure 2:
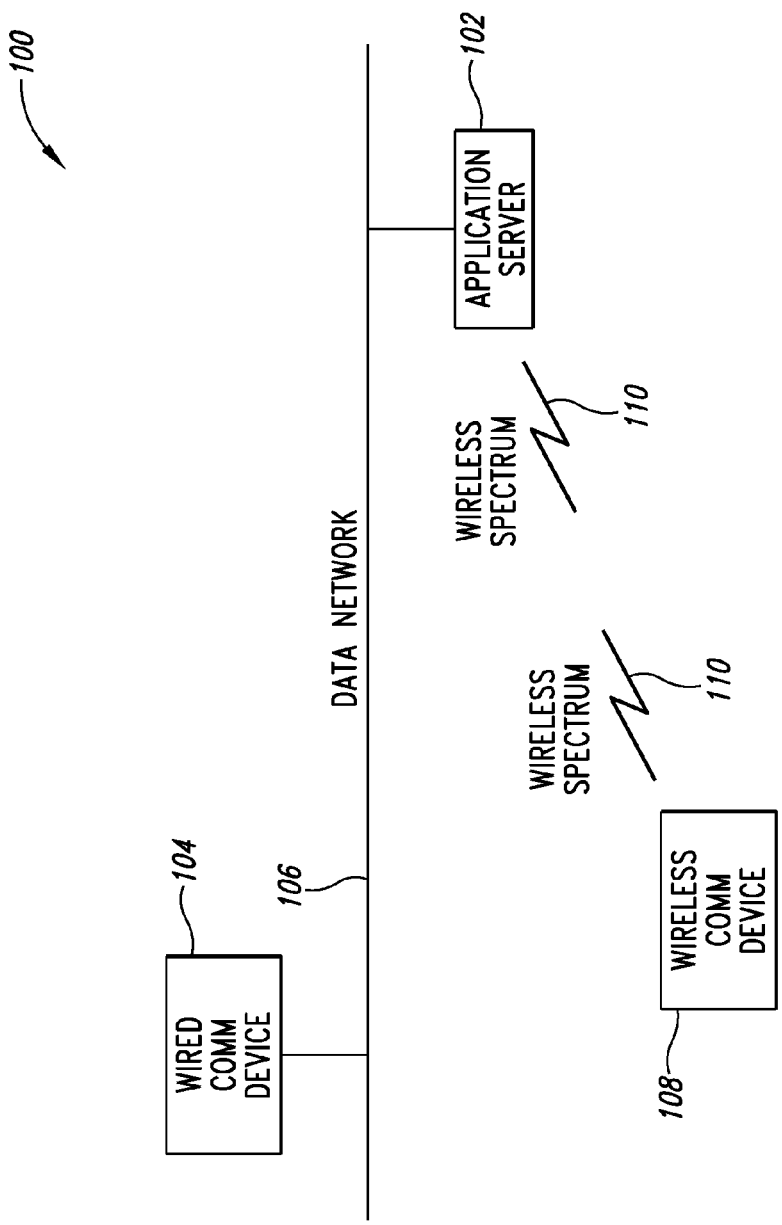
FIG. 2 is schematic block diagram of implementations of the system.

An exemplary implementation of a session system 100 is shown in FIG. 2 as having an application server 102 configured for communication with a wired communication device 104 over a data network 106 and/or a wireless communication device 108 over a wireless spectrum 110 such as a radio frequency spectrum. The application server 102 is typically a computer having components as described above for the computer 20, but can have other types of configurations of the various components found with computers as application servers.

The wired communication device 104 generally can be a computer configured to access the data network 106 as a local area network. In other implementations, the wired communication device 104 could use other types of the data network 106 such as a switched telephone network. As a computer implementation, the wired communication device 104 has components as described above for the computer 20, but can have other configurations for the components as found in the computer industry.

The wireless communication device 108 generally can be a type of mobile communication device such as a laptop computer, cell phone, personal data assistant (PDA), or other such wireless device. As a cell phone, the wireless communication device 108 can use SMS as a stateless messaging service to communicate with the application server 102.

Figure 3:
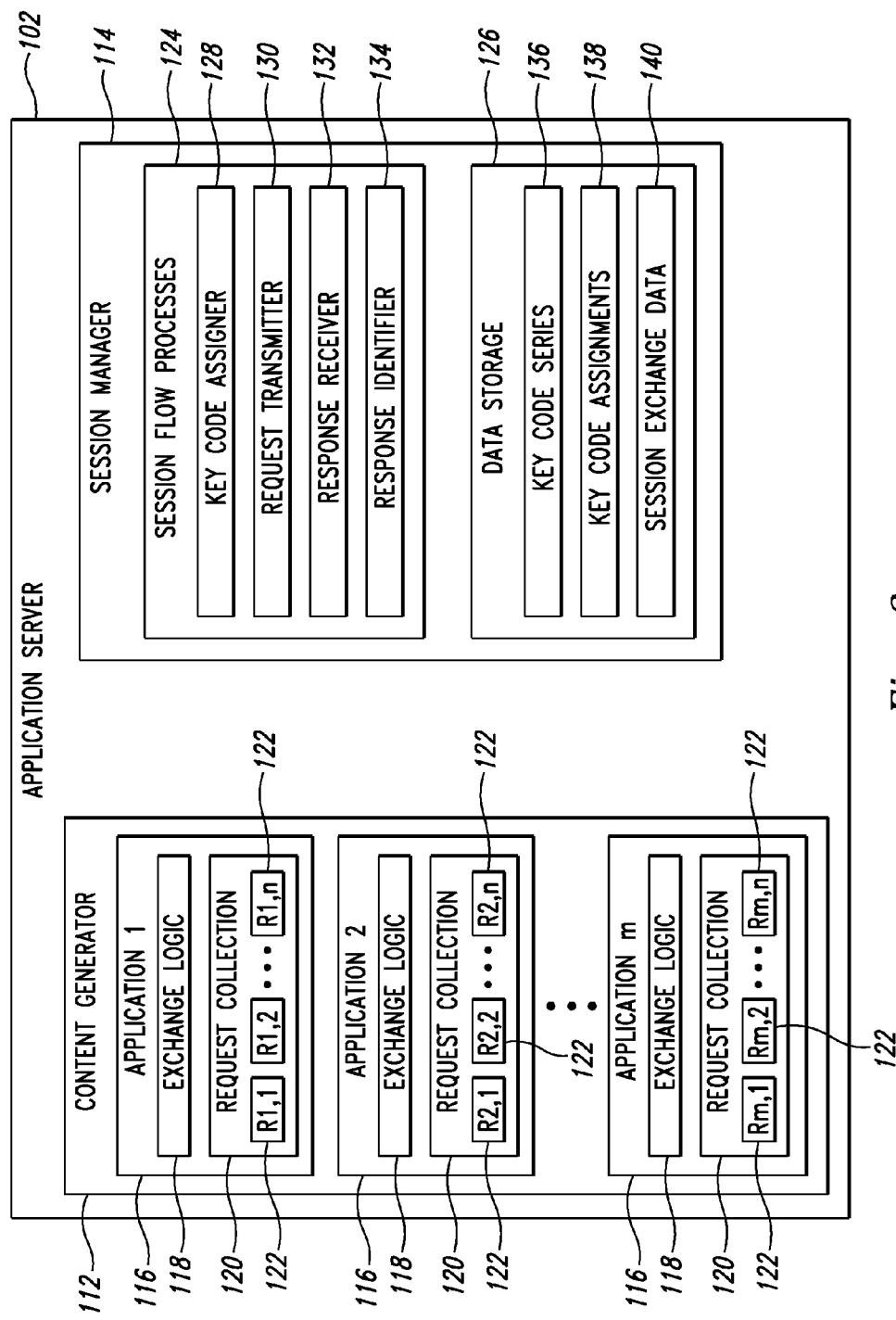
FIG. 3 is a schematic block diagram of an application server of the system.

An exemplary implementation of the application server 102 is shown in FIG. 3 as having a content generator 112 and a session manager 114. The content generator 112 includes applications 116 that can be used for such purposes as conducting surveys or providing guidance as an expert system regarding a particular subject. When used for conducting surveys, each of the applications 116 can generate various questions to elicit responses from survey takers using the wired communication device 104 and/or the wireless communication device 108.

When used for providing guidance in various subject areas as an expert system, each of the applications 116 can send information to a user of the wired communication device 104 and/or the wireless communication device 108. Each of the applications 116 can initially send requests for indication of what information is desired and subsequently send the desired information as indicative in received responses.

Each of the applications 116 includes an exchange logic 118 and a request collection 120. The request collection 120 contains one or more content request messages 122 that are sequentially sent out by the application 116 during a communication session with one of the wired communication devices 104 or the wireless communication devices 108 based upon instructional control of the exchange logic 118.

The content request messages each have a plurality of content response options each identified by a different dynamically assigned key code. The exchange logic 118 of one of the applications 116 sends out a subsequent one of the content request messages 122 based upon content in the form of a key code received prior from the wired communication device 104 and/or the wireless communication device 108.

The session manager 104 includes session flow processes 124 and data storage 126. The session flow processes 124 include a key code assigner 128, a request transmitter 130, a response receiver 132, and a response identifier 134. The data storage includes a key code series 136, a key code assignments 138, and a session exchange data 140. The key code series 136 contains indication as to assignment order that the key code assigner 128 is to follow when assigning key codes to response content options of the content request messages 122.

Figure 4:
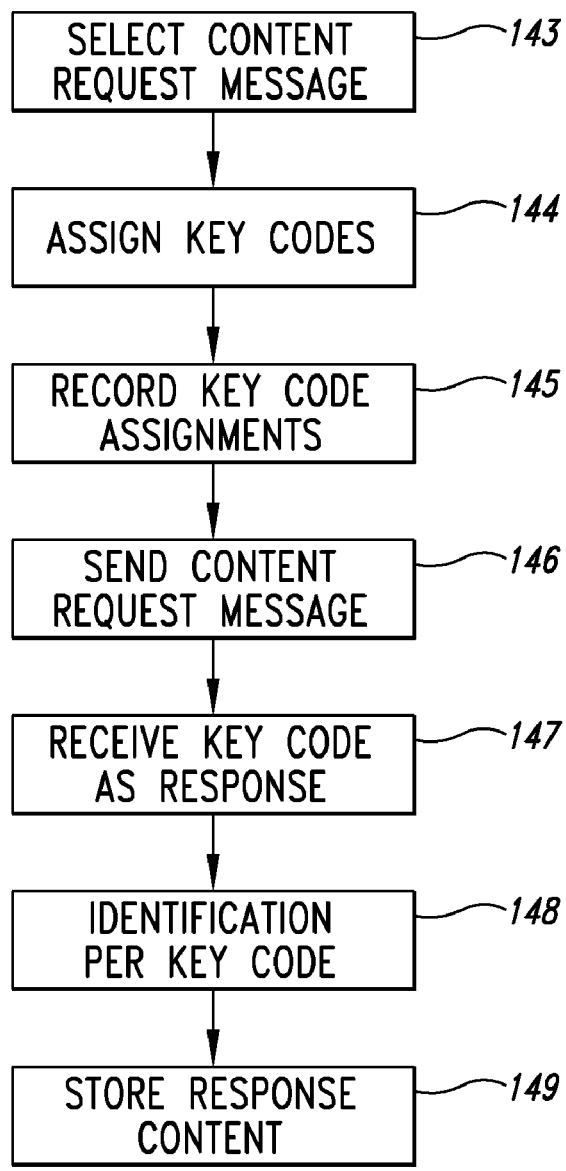
FIG. 4 is flowchart of a method used by implementations of the system.

A method 142 is shown in FIG. 4 for the depicted implementation with an exemplary communication exchange for an exemplary communication session between one of the applications 116 and a selected one of the wired communication devices 104 or the wireless communication devices 108. A content request message 122 is selected (step 143) for transmission by the exchange logic 118 of the application 116. The key code assigner 128 then assigns key codes (step 144) to the response content options of the selected content request message 122 according to an order for key code assignment as indicated by the key code series 136. The assignment of the key codes by the key code assigner 128 to the response content options of the selected content request message 122 is recorded in the key code assignments 138 (step 145).

Continuing the description of the exemplary communication exchange, after assignment of the key codes for the selected content request message 122, the request transmitter 130 sends the selected content request message 122 (step 146) to the selected one of the wired communication device 104 or the wireless communication device 108 of the communication session. A response message containing the communication device identifier (such as a telephone number if the communication device is a telephone such as a cell phone) and a key code is then received by the response receiver 132 (step 147).

The response identifier 134 uses the received communication device identifier and the received key code to identify (step 148) the particular communication session, the application, the content request message, and the content response involved based upon the record stored in the key code assignments 138. Identification is possible of the listed factors because key code assignment is performed by the key code assigner 128 such that for any one communication device identifier (such as a phone number), a particular key code is assigned to at the most only one of the response content options of only one of currently sent but not responded to response content requests (if duplicate responses to the same response content request of one session is not a concern) or to at the most only one of the response content options of only one of the sent response content requests for entire session (if duplicate responses to the same response content request of one session is a concern). For any communication session, the selected response content as indicated by the key codes received by the response receiver 132 can then be stored (step 149) as a history of the communication session in the session exchange data 140.

Figure 5:
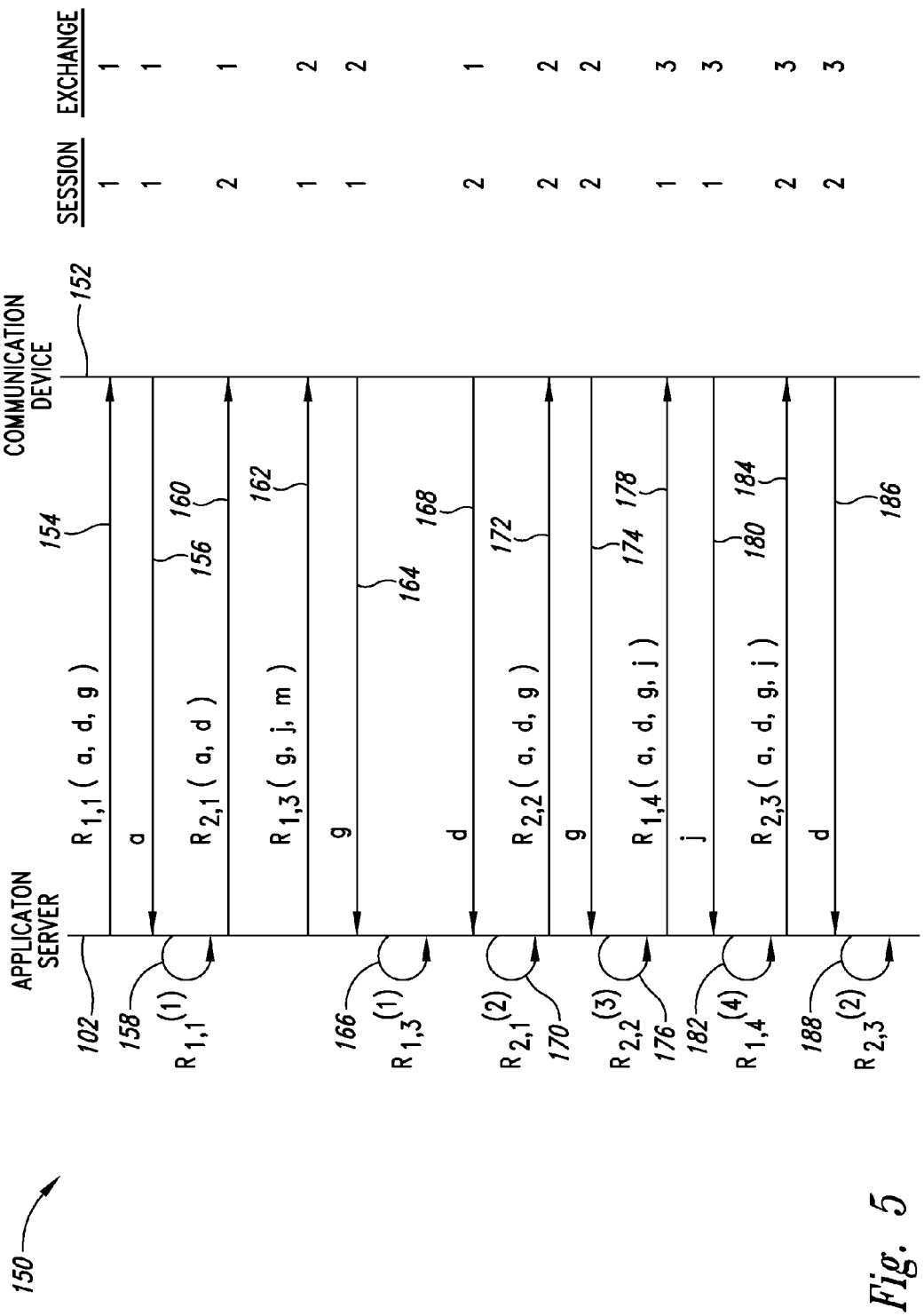
FIG. 5 is a schematic of an exemplary communication record of exchanges involving a depicted implementation of the system.

An exemplary communication record 150 for communication between the application server 102 and a communication device 152, either being the wired communication device 104 or the wireless communication device 108, is shown in FIG. 5. The exemplary communication record 150 reflects a dynamic assignment of key codes that does not identify repeated responses to the same content request message so that the key codes are re-used once the appropriate content request message receives a response from the pertinent communication device as described above. The communication record 150 involves a key code series of "a, d, g, j, m, p, t, and w" for the first eight key codes of the key code series 136. Communication exchanges between the application server 102 and the communication device 152 are excerpted for three separate communication sessions. The three separate communication sessions are depicted as involving three different of the applications 116; however, other examples could include having more than one separate session each involving the same server application 116.

The communication record 150 shows the server 102 sending a first content request message 154 for a first session containing key code assignments of "a", "d", and "g" for the first, second, and third response content options, respectively. The communication device 152 sends a response message 156 to the first content request message 154 of the first session containing the key code "a." The response identifier 134 then determines 158 that the first response content option of the first content request message was selected by the communication device 152.

The server 102 sends a first content request message 160 for a second session containing key code assignments of "a" and "d" for the first and second response content options, respectively.

The server 102 sends a third content request message 162 for the first session containing key code assignments of "g", "j", and "m" for the first, second, and third response content options, respectively. For the first session, the second content request massage (not shown) was by-passed by the exchange logic 118 and the third content request message was instead selected for transmission based upon the response message 156 indicating that the first response content option of the first content request message was selected by the communication device 152.

The communication device 152 sends a response message 164 to the third content request message 162 of the first session containing the key code "g." The response identifier 134 then determines 166 that the first response content option of the third content request message of the first session was selected by the communication device 152.

The communication device 152 sends a response message 168 to the first content request message 160 of the second session containing the key code "d." The response identifier 134 then determines 170 that the second response content option of the first content request message of the second session was selected by the communication device 152.

The server 102 sends a second content request message 172 for the second session containing key code assignments of "a", "d", and "g" for the first, second, and third response content options, respectively. For the second session, the second content request massage was selected for transmission by the exchange logic 118 based upon the response message 168 indicating that the second response content option of the first content request message of the second session was selected by the communication device 152.

The communication device 152 sends a response message 174 to the second content request message 172 of the second session containing the key code "g." The response identifier 134 then determines 176 that the third response content option of the second content request message of the second session was selected by the communication device 152.

The server 102 sends a first content request message 178 for a fourth session containing key code assignments of "a", "d", "g", and "j" for the first, second, third, and fourth response content options, respectively.

The communication device 152 sends a response message 180 to the first content request message 178 of the fourth session containing the key code "j." The response identifier 134 then determines 182 that the fourth response content option of the first content request message of the fourth session was selected by the communication device 152.

The server 102 sends a third content request message 184 for the second session containing key code assignments of "a", "d", "g", and "j" for the first, second, third, and fourth response content options, respectively. For the second session, the third content request massage was selected for transmission by the exchange logic 118 based upon the response message 174 indicating that the third response content option of the second content request message of the second session was selected by the communication device 152.

The communication device 152 sends a response message 186 to the third content request message 184 of the second session containing the key code "d." The response identifier 134 then determines 188 that the second response content option of the third content request message of the second session was selected by the communication device 152.

Configuration parameters can exist to force use of contiguous key codes for an individual content request. Some implementations have a configuration parameter to group key codes into contiguous blocks. For example, for an key code sequence may include "a, d, g, j, m, q, r, x." Accordingly, an equivalent example using contiguous blocks of the example found in FIG. 5 would have a communication including R1,1 (a,d,g) with an "a" response, R2,1(a,d) and R1,3(g,j,m) with just a "d" response. Then for another request, q, r, x need to be used such as R2,2(q,r,x) since a set of three contiguous key codes needs to be used for this implementation.

Figure 6:
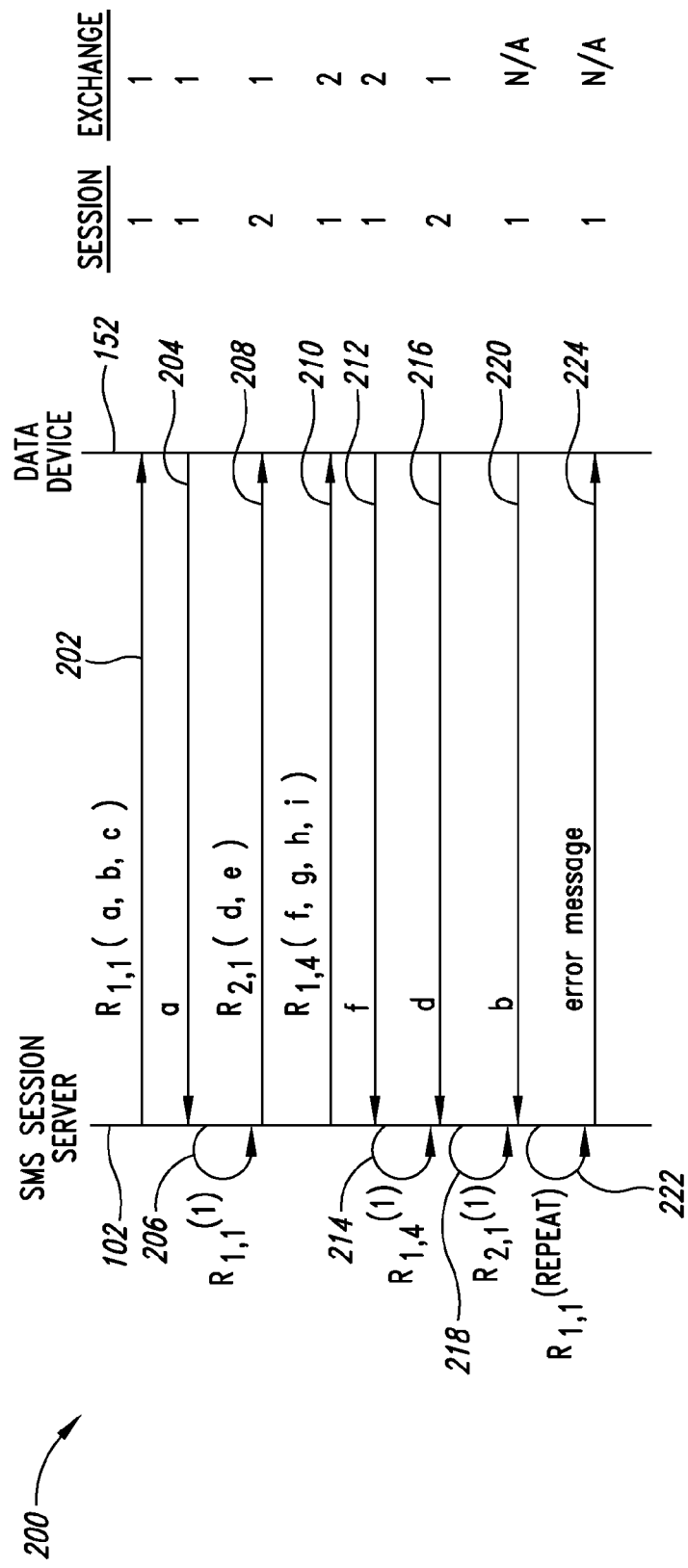
FIG. 6 is a schematic of a second exemplary communication record of exchanges involving a depicted implementation of the system.

An exemplary communication record 200 for communication between the application server 102 and a communication device 152, either having the wired communication device 104 or the wireless communication device 108, is shown in FIG. 6. The exemplary communication record 200 reflects a dynamic assignment of key codes that identifies repeated responses to the same content request message so that the key codes are re-used only after the session for a communication device in which they are currently assigned is completed.

The communication record 200 involves an alphabetical key code series of "a, b, c, d, . . . x, y, z" for the first 26 key codes of the key code series 136. Other key code series could have multiple characters such as "aa," "aaa," etc. Communication exchanges between the application server 102 and the communication device 152 are excerpted for two separate communication sessions. The two separate communication sessions are depicted as involving two different of the applications 116; however, other examples could include having more than one separate session each involving the same server application 116.

The communication record 200 shows the server 102 sending a first content request message 202 for a first session containing key code assignments of "a", "b", and "c" for the first, second, and third response content options, respectively. The communication device 152 sends a response message 204 to the first content request message 202 of the first session containing the key code "a." The response identifier 134 then determines 206 that the first response content option of the first content request message was selected by the communication device 152.

The server 102 sends a first content request message 208 for a second session containing key code assignments of "d" and "e" for the first and second response content options, respectively.

The server 102 sends a fourth content request message 210 for the first session containing key code assignments of "f", "g", "h", and "i" for the first, second, third, and fourth response content options, respectively. For the first session, the second and third content request messages (not shown) were by-passed by the exchange logic 118 and the fourth content request message was instead selected for transmission based upon the response message 204 indicating that the first response content option of the first content request message was previously selected by the communication device 152.

The communication device 152 sends a response message 212 to the fourth content request message 210 of the first session containing the key code "f." The response identifier 134 then determines 214 that the first response content option of the fourth content request message of the first session was selected by the communication device 152.

The communication device 152 sends a response message 216 to the first content request message 208 of the second session containing the key code "d." The response identifier 134 then determines 218 that the first response content option of the first content request message of the second session was selected by the communication device 152.

The communication device 152 sends a response message 220 that is a repeat response to the first content request message 208 of the second session containing the key code "b." The response identifier 134 then determines 222 that the response message 220 is a repeat message and sends an error message 224 regarding such to the communication device 152.

Figure 7:
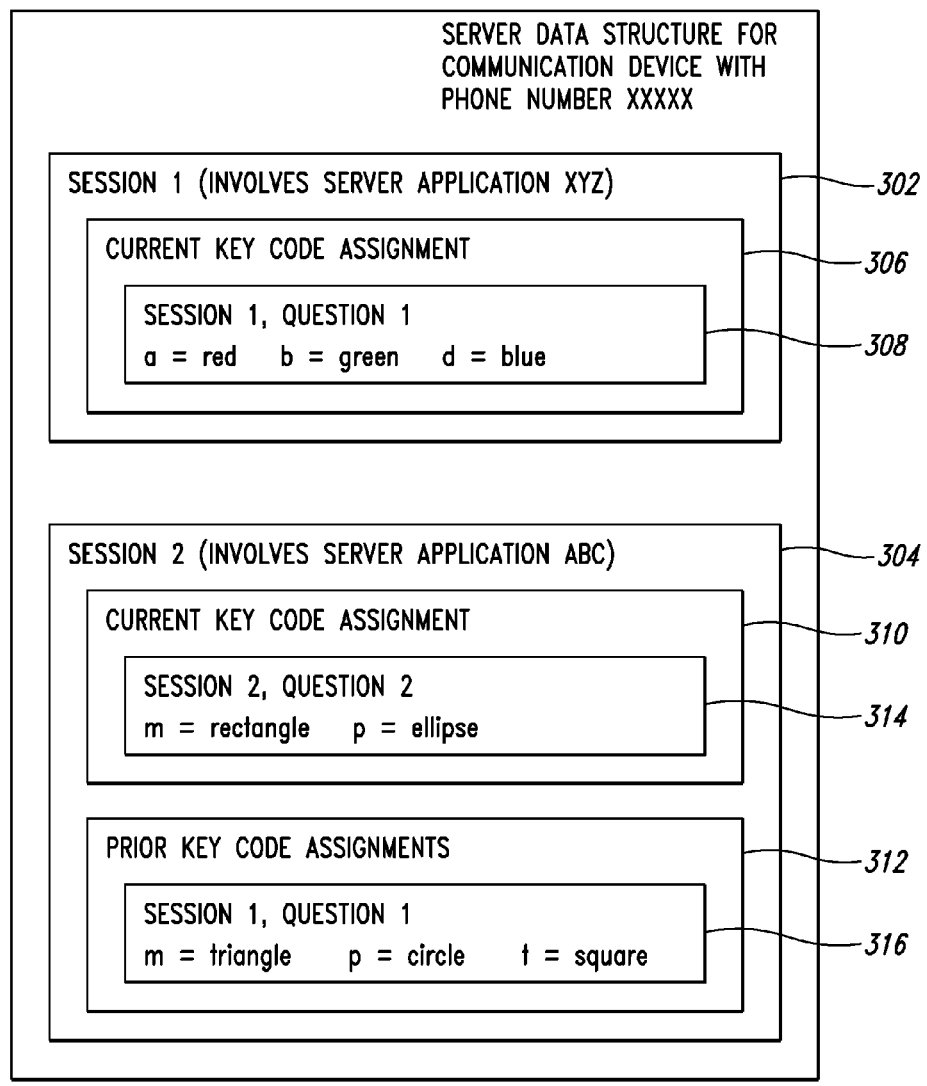
FIG. 7 is a schematic block diagram of an exemplary server data structure for a depicted implementation of the system.

For implementations, an exemplary server data structure 300 is shown in FIG. 7 having a session 1 data record 302 and a session 2 data record 304, which can be stored in the key code assignments 138 and/or the session exchange data 140 of the application server 102. The session 1 data record 302 includes a current key code assignment 306 depicted as having a first question 308 with three content response options identified by key codes "a", "b", and "c" for response content "red", "green", and "blue", respectively.

The session 2 data record 304 includes a current key code assignment 310 and a prior key code assignment 312. The current key code assignment 310 is depicted as having a second question 314 with two content response options identified by key codes "m", and "p" for response content "rectangle" and "ellipse", respectively. The prior key code assignment 312 is depicted as having a first question 316 with three content response options identified by key codes "m", "p", and "t" for response content "triangle", "circle", and "square", respectively.

In other implementations, other sorts of application controllers can manage the server data structure 300, such as shown in FIG. 7, for each communication device involved, such as a cell phone using SMS, communicating with the application server 102. When cell phones or equivalent devices using SMS are the communication devices being served, the communication devices are identified by their phone numbers in SMS messages from the communication devices inbound to the application server 102. Phone numbers parsed from messages received by the application server 102 from the communication devices are then used to retrieve the server data structure 300 of the communication device. For each session initiated for a particular communication device, a new session data structure, such as the session 1 data record 302, is created as part of the server data structure 300 for the particular communication device.

In implementations, when the response content request is in the form of a question, the response content option selections as answer option selections can have key codes associated with various answers associated with the question. For instance, a question message can be sent to a cell phone with answer options identified with key codes. The key codes can be dynamically assigned to the answer options according to one of two approaches described above. In the first approach, each of the key codes is assigned to a different one of the answer options of one of the question messages for an initial session of a server application generating question messages to be sent to a communication device. The key code is never reassigned for the communication device involved while the initial session exists.

In a second approach, each of the key codes are dynamically assigned to a different answer option of one of the question messages during an initial session involving a particular instance of an application program generating question messages to a particular communication device. However, once a response answer message containing an answer identified by one of the key codes associated with the question message is sent from the particular communication device to the server application, the key code can be dynamically reassigned to another answer option of another question message of the same initial session.

Forward planning regarding dynamic assignment of key codes to answer options is helpful. Knowing all outstanding answer options that have already been assigned and are not yet ready for reassignment across all active server applications for a particular communication device allows subsequent dynamic assignment of answer options according to desired considerations (such as ergonomics or device efficiencies) in generating a keyed SMS response message to answer associated question messages. For instance, certain ergonomic advantages are involved with a rated ordering of possible key codes used such as the rated order of single character selection on a 10 digit phone may be viewed as the following partial series: a, d, g, j, m, p, t, and w.

In implementations, when a question is answered by a user's SMS message the question in marked as answered in the session data structure of the server data structure 300. Identification of the appropriate session data structure, allows the system to determine what question to ask next. The session data structure is also used to decode the answer received and pass the decoded answer to the application associated with the session (this could be a survey, reporting application, or something else sharing a shortcode).

When the next message is sent from the server to the user's phone, the system selects the key codes for the answer options appropriately through guidance from the server data structure 300. If it is desired to detect if an SMS question receives multiple answers, the system does not reuse the answer codes used in subsequent questions that are sent to a user's phone for at least the duration of the associated session.

The following examples depict aspects of the system.

Example Survey 1

For instance, a survey has the following questions:
Question 1
What is your favorite color?
Answer Options:
Red, Green, or Blue
Question 2
What other color do you like?
Answer Options:
Pink, or purple Example Survey 2

For instance, a survey has the following questions.
Question 1
What is your favorite shape?
Answer Options:
Triangle, circle, or square
Question 2
What other shapes do you like?
Answer Options:
Rectangle, or ellipse For the case where it is not desired to detect if an SMS question receives multiple answers, the question SMS messages to the cell phone can appear as follows (these examples could be modified to detect if an SMS question receives multiple answers).

Example Case 1

A Single Session

Survey 1: Question 1
What is your favorite color?
Text a for red, d for green, j for blue
<user texts into a communication device a to answer red to question 1 and the server 102 system responds with question 2>
Survey 1: Question 2
What other color do you like?
Text a for pink, d for purple
Etc.

Example Case 2

Multiple Concurrent Sessions of Different Surveys

For instance, a phone is involved in two phone surveys at the same time.
Question 1 from both surveys is received before answering question 1 of survey 2.
Survey 1: Session 1: Question 1
What is your favorite color?
Text a for red, d for green, j for blue
Survey 2: Session 2: Question 1
What is your favorite shape?
Text m for triangle, p for circle, t for square
<user texts m to answer triangle to question 1 and the system response with survey 2: question 2>
Survey 2: Session 2: Question 2
What other shapes do you like?
Text m for rectangle, p for ellipse
Etc.

Example Case 3

Multiple Concurrent Session of the Same Survey

In this case 3 the same communication device, such as a phone, initiates the survey twice. For the example, the phone user invokes a keyword and receives question 1, and without answering question 1 the user invokes the keyword again to start a second session. Next the communication device sends an SMS message to the server to answer question 1 from the first session
Survey 1: Session 1: Question 1
What is your favorite color?
Text a for red, d for green, j for blue
<another second session of the same survey is started Survey 1: Session 2: Question 1 gets sent>
Survey 1: Session 2: Question 1
What is your favorite color?
Text m for red, p for green, t for blue <user texts 'a' to answer red to session 1 question 1 and the system responds with session 1 question 2>
Survey 1: Session 1: Question 2
What other color do you like?
Text a for pink, d for purple.

In one or more various implementations, related systems include but are not limited to circuitry and/or programming for effecting the foregoing-referenced method implementations; the circuitry and/or programming can be virtually any combination of hardware, software, and/or firmware configured to effect the foregoing-referenced method implementations depending upon the design choices of the system designer.

The descriptions are summaries and thus contain, by necessity; simplifications, generalizations and omissions of detail; consequently, those skilled in the art will appreciate that the summaries are illustrative only and are not intended to be in any way limiting. Other aspects, inventive features, and advantages of the devices and/or processes described herein, as defined solely by the claims, will become apparent with respect to the non-limiting detailed description set forth herein.

Those having ordinary skill in the art will also appreciate that although only a number of server applications are shown, any number of server applications running on one or more server computer could be present (e.g., redundant and/or distributed systems could be maintained). Lastly, those having ordinary skill in the art will recognize that the environment depicted has been kept simple for sake of conceptual clarity, and hence is not intended to be limiting.

Those having ordinary skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having ordinary skill in the art will appreciate that there are various vehicles by which processes and/or systems described herein can be effected (e.g., hardware, software, and/or firmware), and that the preferred vehicle will vary with the context in which the processes are deployed.

For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The detailed description has set forth various embodiments of the devices and/or processes via the use of block diagrams, flowcharts, and examples. Insofar as such block diagrams, flowcharts, and examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A system for communication with a wireless communication device, the system comprising:
   a request transmitter configured to transmit a first content request message to the wireless communication device, the first content request message comprising a plurality of response content options;
   a key code assigner configured to assign a different key code to each of the response content options of the first content request message prior to transmission of the first content request message to the wireless communication device by the request transmitter,
   the request transmitter being further configured to transmit a second content request message comprising a plurality of response content options to the wireless communication device after transmitting the first content request messages to the wireless communication device but before a response to the first content request message is received from the wireless communication device,
   the key code assigner being further configured to dynamically assign a different key code to each of the response content options of the second content request message prior to transmission of the second content request message to the wireless communication device based upon the key codes assigned to the response content options of the first content request message by the key code assigner, the key codes dynamically assigned to the response content options of the second content request message being different from the key codes assigned to the response content options of the first content request message;
   a data storage containing key code assignments made by the key code assigner to the response content options of the second content request message; and
   a response identifier configured to identify a characteristic of a response message containing one of the key codes assigned to the response content options of the second content request message, the response identifier being configured to identify the characteristic of the response message based upon the key code received in the response message and the key code assignments contained in the data storage, the response message elicited by transmission of the second content request message to the wireless communication device.

2. The system of claim 1, further including:
   a plurality of content request messages, each content request message including a plurality of response content options; and
   a plurality of applications, each application having exchange logic and a different portion of the plurality of the content request messages, the exchange logic of each of the applications configured to provide instructional control of at least one communication session, each of the communication sessions of each of the applications having exchanges of content request messages of the application and response messages transmitted by the wireless communication device in response to transmitted content request messages of the communication session.

3. The system of claim 2, wherein the first content request message is of a first communication session and the second content request message is also of the first communication session.

4. The system of claim 2, wherein the first content request message is of a first communication session and the second content request message is of a second communication session, the first communication session being different than the second communication session.

5. The system of claim 4, wherein the key code assigner is configured to assign one of the different key codes to one of the content response options of the second content request message after the first communication session has concluded.

6. The system of claim 4, wherein the first content request message is of a first application and the second content request message is also of the first application.

7. The system of claim 4, wherein the first content request message is of a first application and the second content request message is of a second application, the first application being different than the second application.

8. The system of claim 1, wherein the different key codes are characters.

9. The system of claim 8, wherein the different key codes are alphanumeric characters.

10. The system of claim 1, wherein the characteristic of the response message is a communication session of the response message.

11. The system of claim 1, wherein the characteristic of the response message is a response content of the response message.

12. The system of claim 1, wherein the characteristic of the response message is a server application of the response message.

13. The system of claim 1, wherein the characteristic of the response message is an identity of the response message.

14. A system for communication with a wireless communication device, the system comprising:
means for transmitting a first content request messages to the wireless communication device;
means for assigning a different key code to each of the response content options of the first content request message prior to transmission of the first content request message to the wireless communication device;
means for transmitting a second content request message comprising a plurality of response content options to the wireless communication device after the first content request message has been transmitted to the wireless communication device but before a response to the first content request message is received from the wireless communication device;
means for dynamically assigning a different key code to each of the response content options of the second content request message prior to transmission of the second content request message to the wireless communication device based upon the key codes assigned to the response content options of the first content request message, the key codes dynamically assigned to the response content options of the second content request message being different from the key codes assigned to the response content options of the first content request message;
means for storing key code assignments for the second content request message; and
means for identifying a characteristic of a response message containing one of the key codes assigned to the response content options of the second content request message, identifying the characteristic of the response message being based upon the key code received in the response message and the key code assignments contained in the data storage, the response message having been elicited by the transmitting of the second content request message to the wireless communication device.

15. The system of claim 14, further including:
means for providing a plurality of content request messages, each content request message including a plurality of response content options;
means for providing a plurality of applications, each application having a different portion of the plurality of the content request messages; and
means for providing instructional control of at least one communication session, each of the communication sessions of each of the applications having exchanges of content request messages of the application and response messages transmitted by the wireless communication device in response to transmitted content request messages of the communication session.

16. The system of claim 15, wherein the first content request message is of a first communication session and the second content request message is also of the first communication session.

17. The system of claim 15, wherein the first content request message is of a first communication session and the second content request message is of a second communication session, the first communication session being different than the second communication session.

18. The system of claim 17, wherein the means for dynamically assigning includes
means for assigning one of the different key codes to one of the content response options of the second content request message after the first communication session has concluded.

19. The system of claim 17, wherein the first content request message is of a first application and the second content request message is also of the first application.

20. The system of claim 17, wherein the first content request message is of a first application and the second content request message is of a second application, the first application being different than the second application.

21. The system of claim 14, wherein the different key codes assigned to the response content options of the second content request message are characters.

22. The system of claim 21, wherein the different key codes assigned to the response content options of the second content request message are alphanumeric characters.

23. The system of claim 14, wherein the characteristic of the response message is a communication session of the response message.

24. The system of claim 14, wherein the characteristic of the response message is a response content of the response message.

25. The system of claim 14, wherein the characteristic of the response message is a server application of the response message.

26. The system of claim 14, wherein the characteristic of the response message is an identity of the response message.

* * * * *